United States Patent [19]

Leenhouts

[11] Patent Number: 4,896,947
[45] Date of Patent: Jan. 30, 1990

[54] LIQUID CRYSTAL DISPLAY CELL

[75] Inventor: Frans Leenhouts, Kaiseraugst, Switzerland

[73] Assignee: Hoffman-La Roche Inc., Nutley, N.J.

[21] Appl. No.: 366,332

[22] Filed: Jun. 14, 1989

Related U.S. Application Data

[63] Continuation of Ser. No. 246,026, Sep. 14, 1988, abandoned, which is a continuation of Ser. No. 106,696, Oct. 8, 1987, abandoned.

[30] Foreign Application Priority Data

Oct. 24, 1986 [CH] Switzerland .......................... 4234/86

[51] Int. Cl.$^4$ ............................................... G02F 1/13
[52] U.S. Cl. .................................... 350/337; 350/341; 350/346
[58] Field of Search ............... 350/337, 346, 340, 341, 350/334

[56] References Cited

U.S. PATENT DOCUMENTS

| | | | |
|---|---|---|---|
| 3,915,554 | 10/1975 | Maezawa | 350/337 |
| 3,947,185 | 3/1976 | Maezawa | 350/337 |
| 4,039,252 | 8/1977 | Mizuno et al. | 350/341 |
| 4,418,987 | 12/1983 | Takanashi et al. | 350/337 |
| 4,426,133 | 1/1984 | Funada et al. | 350/337 |
| 4,653,861 | 3/1987 | Kando et al. | 350/337 |
| 4,693,562 | 9/1987 | Hasegawa et al. | 350/337 |

FOREIGN PATENT DOCUMENTS

| | | | |
|---|---|---|---|
| 0023796 | 2/1981 | European Pat. Off. | |
| 3138518 | 2/1983 | Fed. Rep. of Germany | |
| 0090618 | 6/1982 | Japan | 350/337 |
| 0188016 | 11/1982 | Japan | 350/341 |
| 0091422 | 5/1984 | Japan | 350/337 |
| 0045229 | 3/1986 | Japan | 350/337 |
| 0279315 | 12/1987 | Japan | 350/337 |

OTHER PUBLICATIONS

Patent Abstract of Japan, Band 10, Nr. 111 (P-451) 2168, 4/25/86 and JP-A 50 243 634 (Suwa Seikosha K.K.).
Appl. Phys. Let. 50(21) 1468 (1987).

Primary Examiner—Stanley D. Miller
Assistant Examiner—Huy Kim Mai
Attorney, Agent, or Firm—George M. Gould; Bernard S. Leon; A. Kate Huffman

[57] ABSTRACT

A liquid crystal display (LCD) cell comprising a twist nematic liquid crystal disposed between two electrode plates and polarizers and having a positive dielectric anisotropy. The optical path difference $\Delta n.d$ is 0.2 to 0.7 $\mu m$. The absolute value of the twist angle $\phi$ can be between 10° and 80°, the angle $\psi$ between the polarizers can be between 80° and 110° and the angle $\theta$ between the surface orientation direction and the polarization direction on the screen on the light incidence side can be between −10° and 60°, preferably so that the polarizers are symmetrical of the nematic directors.

9 Claims, 2 Drawing Sheets

LIQUID CRYSTAL DISPLAY CELL

This application is a continuation of application Ser. No. 246,026, filed Sept. 14, 1988, which is a continuation of Ser. No. 106,696 filed Oct. 8, 1987 both now abandoned.

FIELD OF THE INVENTION

The invention relates to a liquid crystal display (LCD) cell comprising a twisted nematic liquid crystal layer which is disposed between two plates and polarizers having electrodes and surface orientations and which has a positive dielectric anisotropy.

The invention relates more particularly to an LCD cell of the kind set out wherein the nematic liquid crystal layer has a very low optical path difference.

BACKGROUND

The LCD cell according to the invention is of very similar construction to known cells, such as Twisted Nematic LCDs (Schadt and Helfrich, Appl. Phys. Lett. 18, 127 [1971]).

If they are to have a high multiplex ratio, LCD cells must of course have a steep electro-optical characteristic. The corresponding development was concentrated on highly twisted nematic structures. The term "highly twisted nematic structures" is to be understood as denoting structures having a twist of more than 90°. Of course, doping with chiral additives is usually necessary to produce such a twist.

The advantages of liquid crystal cells having highly twisted nematic structures are a very steep electro-optical characteristic and a wide viewing angle range. The steep electro-optical characteristic leads to high multiplex ratios which are necessary to provide indications of high information density.

A disadvantage was found to be the intensive interference colors of such display cells at any viewing angle within its wide angle range which, if color variations are to be avoided, call for very accurate plate spacing and, therefore, expensive and highly precise production processes. Also, the strong inherent coloring of such displays is an obstacle to their use as neutral-color electro-optical switches such as are required inter alia for color TV or for colored display screens utilizing a substantially fixed viewing angle.

Additionally, little regard was had for the fact that the main requirement for some purposes is not a high multiplex ratio but the possibility of providing a highly differentiated grey scale. This is more particularly the case, for example, for television applications having a substantially perpendicular viewing angle.

SUMMARY OF THE INVENTION

It is therefore the object of the invention to provide an LCD cell having an electro-optical characteristic with a very low slope.

According to the invention, this object is achieved by an LCD cell of the kind hereinbefore mentioned which is characterized by the combination of: a twist angle $\phi$ of from 10° to 80°; and angle $\theta$ between the surface orientation direction and the polarization direction of the plate on the light incidence side of from $-30°$ to 60°; an angle $\psi$ between the polarization directions of the two polarizers of from 80° to 110°; and an optical path difference $\Delta n.d$ of from 0.2 to 0.7 mm.

In particular, the liquid crystal display (LCD) cell, according to the invention comprises a twisted nematic liquid crystal having a positive dielectric anisotropy, which is disposed between two plates having electrodes and surface orientations. The plates are disposed between two polarizers, and the LCD cell further includes, in combination, a twist angle $\phi$ between the nematic directors of the liquid crystal at the respective plates of from about 10° to about 80°; an angle $\theta$ between the surface orientation direction and the polarization direction of the plate on the light incidence side of from about $-30°$ to about 60°; an angle $\psi$ between the polarization directions of the two polarizers of from about 80° to about 110°; and an optical path difference $\Delta n.d$ of from about 0.2 to about 0.7 $\mu$m.

BRIEF DESCRIPTION OF THE DRAWINGS

Embodiments of the invention will be described hereinafter with reference to the drawings wherein.

DESCRIPTION OF THE PREFERRED EMBODIMENT

Figure 1:
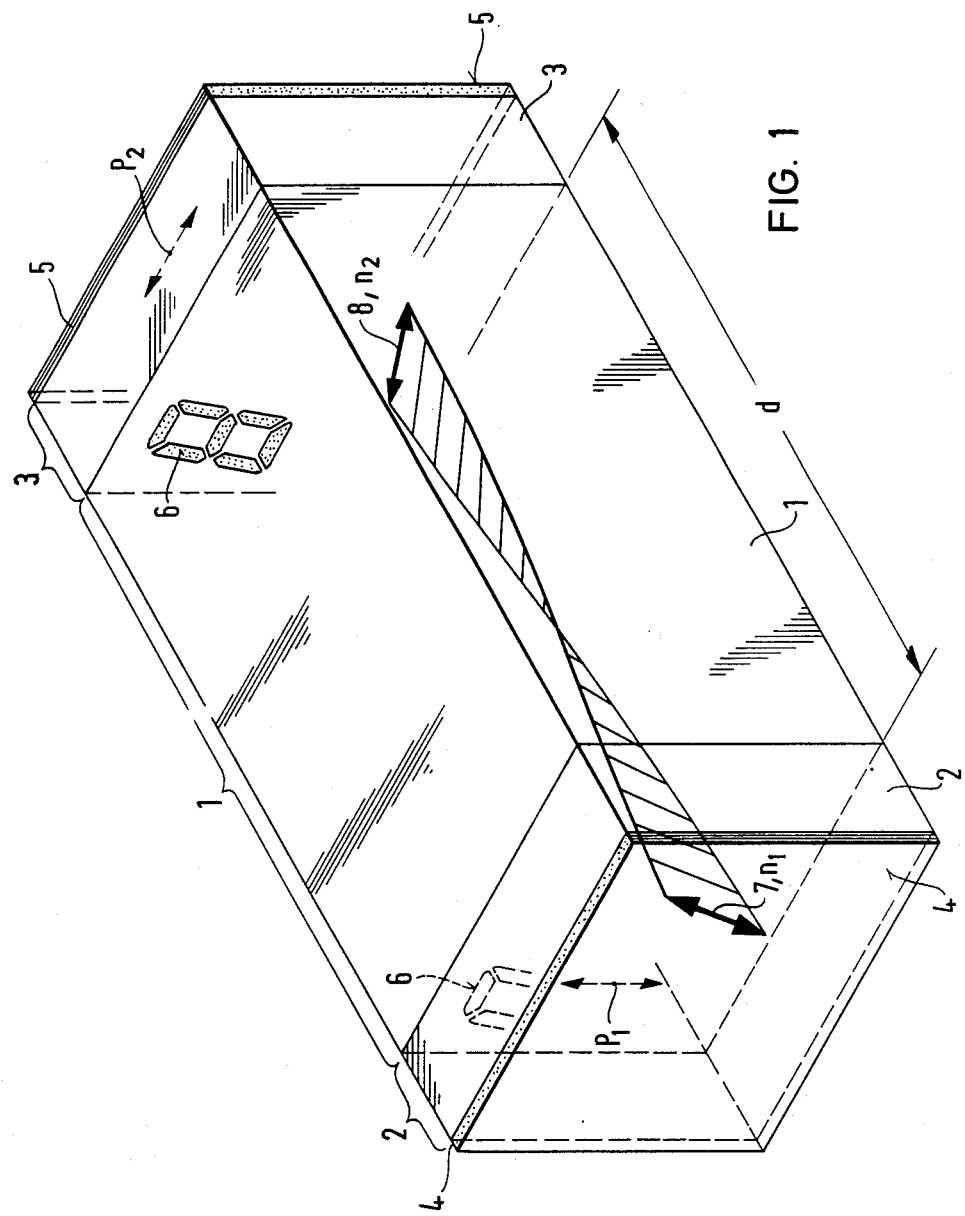
FIG. 1 is a diagrammatic exploded view of an LCD cell according to the invention.

For the purposes of this description the following angles are to be understood as follows:

The twist angle $\phi$ is the angle included between the planes which are defined by the two nematic directors on the front plate—i.e., the plate on the light incidence side—and on the rear plate and which are perpendicular to the plates—i.e., in other words the angle by which the nematic directors are offset from one another.

The angle $\theta$ is the angle between the surface orientation on the front plate or on the nematic director $n_1$ on the plate and the polarization direction of the polarizer associated with the last-mentioned plate. Positive values of the angle $\theta$ indicate that the polarization direction is outside the angle $\phi$ while negative values of $\theta$ indicate a polarization direction between the nematic directors.

The angle $\psi$ is the angle by which the polarizers are offset from one another. The polarizers are called crossed when they substantially bar the passage of light without any light-influencing means between them. That is, as used herein the term "crossed" covers all the corresponding values of $\psi$ and is not limited exclusively to a 90° offset.

The resulting cell provides a positive contrast display and, surprisingly, is not coloured for low values of $d\Delta n$, $\theta = 0$ and substantially perpendicular light incidence.

In positive contrast displays electrically energized segments appear dark on a bright background whereas in negative contrast displays the situation is the converse.

The cell according to the invention comprises a liquid crystal layer 1 disposed between two plates 2, 3 which are disposed substantially plane-parallel to one another and which are made of a transparent material such as glass or acrylic glass or plastic foils or the like. A polarizer 4 is disposed before the front plate 2 and is preferably connected thereto, for example, by sticking. A polarizer 5 is similar associated with the rear plate 3. The plates are separated from one another by a spacing or gap d.

On their surfaces facing the liquid crystal the plates 2, 3 have conventional electrode coatings 6 which may be segmented as is known in the art for the display of symbols or dots, for example.

Also, the surfaces are so treated as to exert a directional effect on the adjacent liquid crystal molecules and thus determine the direction of the nematic director n. The treatment resides, for example, in rubbing the surface in one direction or in the oblique evaporation of orienting layers etc; it is not necessary, but neither it is disadvantageous, to provide a tilt angle. The result of this treatment will be called surface orientation for the purpose hereof. An arrow 7 indicates the surface orientation on the front plate 2. The surface orientation on the rear plate 3 is offset from that of the front plate and is indicated by an arrow 8.

The front plate polarizer is so disposed that its polarization direction includes, relative to the twist angle in the outwards direction, a predetermined angle which will be described in greater detail hereinafter. The rear polarizer is so disposed that its direction of polarization crosses that of the first polarizer.

The liquid crystal 1 is a nematic liquid crystal which can have chiral additives.

Figure 2:
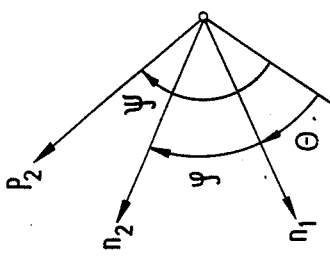
FIG. 2 is a diagram showing the arrangement of angles, the surface orientations and the polarizers relative to one another.

FIG. 2 illustrates the relative angular relationships of the nematic directors and the polarization directions. As previously stated, $n_1$ is the nematic director on the front plate 2 and $n_2$ is the nematic director on the rear plate 3.

The angle of twist between the two nematic directors has the reference $\phi$. This angle is approximately 50° in the present embodiment. However, it can vary on either side of 50°. Satisfactory results are obtained with absolute values of $\phi$ between 10° to 80°, preferably 20° and 60°, more particularly 30° and 50°.

When describing angles $\phi$, $\theta$ and $\psi$ herein a positive angle shaall refer to a left-hand rotation while a negative angle shall refer to a right-hand rotation travelling from the front plate 2 to the rear plate 3.

The front polarizer 4 has a polarization direction $P_1$. In this embodiment such direction is offset by an angle $\theta$ of 20° from the nematic director $n_1$. However, the direction $P_1$ can vary by an angle $\theta$ from the nematic director $n_1$ in a range of from $-30° < \theta < 60°$. In other words, the polarizers can be arranged symmetrically of the nematic directors. The condition for this is $\theta = (90° - \phi)/2$ if $\psi = 90°$. Symmetry is preferable but not obligatory. The polarization direction $P_2$ of the rear polarizer 5 is offset from that of the front polarizer $P_1$ by an angle $\psi$ which is preferably 90°. However, satisfactory results are obtained with an angle $\psi$ of from 80° to 110°. The polarization directions $P_1$ and $P_2$ can be changed over without adverse results.

EXAMPLES

The following liquid crystal mixtures were prepared.

| | Mixture "A" Component | Concentration (weight %) |
|---|---|---|
| φd(4)CP | p-[trans-4-(4-pentenyl) cyclohexyl]benzonitrile | 8,000 |
| 5CP | p-(trans-4-pentylcyclo- hexyl)benzonitrile | 11,000 |
| 4P(1)P | p-(5-butyl-2-pyrimidinyl)- benzonitrile | 3,000 |
| 5CAP02 | p-[2-(trans-4-pentylcyclo- hexyl)ethyl]-ethoxybenzene | 6,000 |
| 3CEC3 | trans-4-propylcyclohexane carboxylic acid-trans-4- -propylcyclohexyl ester | 8,000 |
| 4CEC4 | trans-4-butylcyclohexane carboxylic acid-trans-4- -butylcyclohexyl-ester | 11,000 |
| 5CEC3 | trans-4-pentylcyclohexane carboxylic acid-trans-4- -propylcyclohexyl-ester | 11,000 |
| 5CPAC4 | 1-[2-(trans-4-butylcyclo- hexyl)-ethyl]-4-(trans-4- -pentylcyclohexyl)benzene | 9,500 |
| 5CPPAC4 | 4-[2-(trans-4-butylcyclo- hexyl)-ethyl]4'-(trans-4- -pentyl-cyclohexyl)biphenyl | 5,500 |
| 5CPAPAC4 | 4-(trans-4-pentylcyclohexyl) -4'-[2-(trans-4-butylcyclo- hexyl)-ethyl]-1,1'-ethylene- dibenzene | 7,000 |
| 4CEP02 | trans-4-butylcyclohexane carboxylic acid-p-ethoxy- -phenylester | 11,000 |
| 5CEP01 | trans-4-pentylcyclohexane carboxylic acid-p-methoxy- hexylester | 9,000 |

| | Mixture "B" Component | Concentration (weight %) |
|---|---|---|
| 4P(1)P | p-(5-butyl-2-pyrimidinyl)- benzonitrile | 8,820 |
| φd(3)CP | p-[trans-4-(3-butenyl)- cyclohexyl]benzonitrile | 7,390 |
| 1d(3)CP | p-[trans-4-(3E-pentenyl)- cyclohexyl]benzonitrile | 7,420 |
| φd(4)CPP | 4'-[trans-4-(4-pentenyl)-4- biphenylcarbonitrile | 6,170 |
| 3CEC3 | trans-4-propylcyclohexane carboxylic acid-trans-4- propylcyclohexyl ester | 21,050 |
| 4CEC4 | trans-4-butylcyclohexane carboxylic acid-trans-4- butylcyclohexylester | 28,100 |
| 5CEC3 | trans-4-pentylcyclohexane carboxylic acid-trans-4- propylcyclohexylester | 21,050 |

The designation of the components is known to the skilled addressee. Reference is made in this connection, for example to the publication of Schadt, M. et al in Mol. Cryst. Lig. Cryst. 122 (1985) 241ff and in Proc. Int. Displ. Res. Conf., San Diego (1985).

In accordance with the invention, any conventional twisted nematic liquid crystal mixtures having a positive dielectric anisotropy may be utilized in the LCD cell according to the invention.

The following Table 1 lists the relevant parameters of the two mixtures "A" and "B".

TABLE 1

| | Mixture "A" | Mixture "B" |
|---|---|---|
| Clearing point $T_{Cl}$ [° C.] | 72 | 42.5 |
| Melting point $T_m$ [° C.] | <−20 | <0 |
| $n_o$ | 1,432 | 1,476 |
| Optical anisotropy $\Delta n$ | 0,086 | 0,072 |
| Viscosity $\eta$ / (at 22° C.) [m pa. s] | 23 | 21 |

The electro-optical results compiled in the following Table 2 were obtained with these mixtures. The results achieved with novel cells according to the invention are in each case compared with the values obtained with the same liquid crystal mixtures in a conventional twisted nematic cell and listed in the third column.

TABLE 2

| | Inventive Cells | | Conventional Cell |
|---|---|---|---|
| | $\phi = 30°$ $\theta = 30$ $\psi = 90$ | $\phi = 60$ $\theta = 15$ $\psi = 90$ | $\phi = 90$ $\theta = 0$ $\psi = 90$ |
| Mixture "A" | | | |
| $V_{10}$ (Volt) | 2.165 | 2.058 | 1.971 |
| $V_{50}$ (Volt) | 2.895 | 2.617 | 2.265 |
| $P_o$ | 0.337 | 0.271 | 0.149 |
| d [μm] | 3.4 | 3.8 | 4.0 |
| dΔn [μm] | 0.29 | 0.33 | 0.34 |
| Mixture "B" | | | |
| $V_{10}$ (Volt) | 1.562 | 1.614 | 1.441 |
| $V_{50}$ (Volt) | 2.092 | 2.015 | 1.671 |
| $P_o$ | 0.339 | 0.248 | 0.159 |
| d [μm] | 4.5 | 6.0 | 7.0 |
| dΔn [μm] | 0.32 | 0.43 | 0.50 |

Key to Table 2:
$V_{10}$ denotes the optical threshold voltage at 10% extinction (or 90% transmission).
$V_{50}$ denotes the voltage at 50% extinction or transmission.
$p_o$ denotes the steepness of the transmission curve at a viewing or light incidence angle $\beta = 0°$ in accordance with the formula:

$$p_o = \frac{V_{50} - V_{10}}{V_{10}}$$

Figure 3:
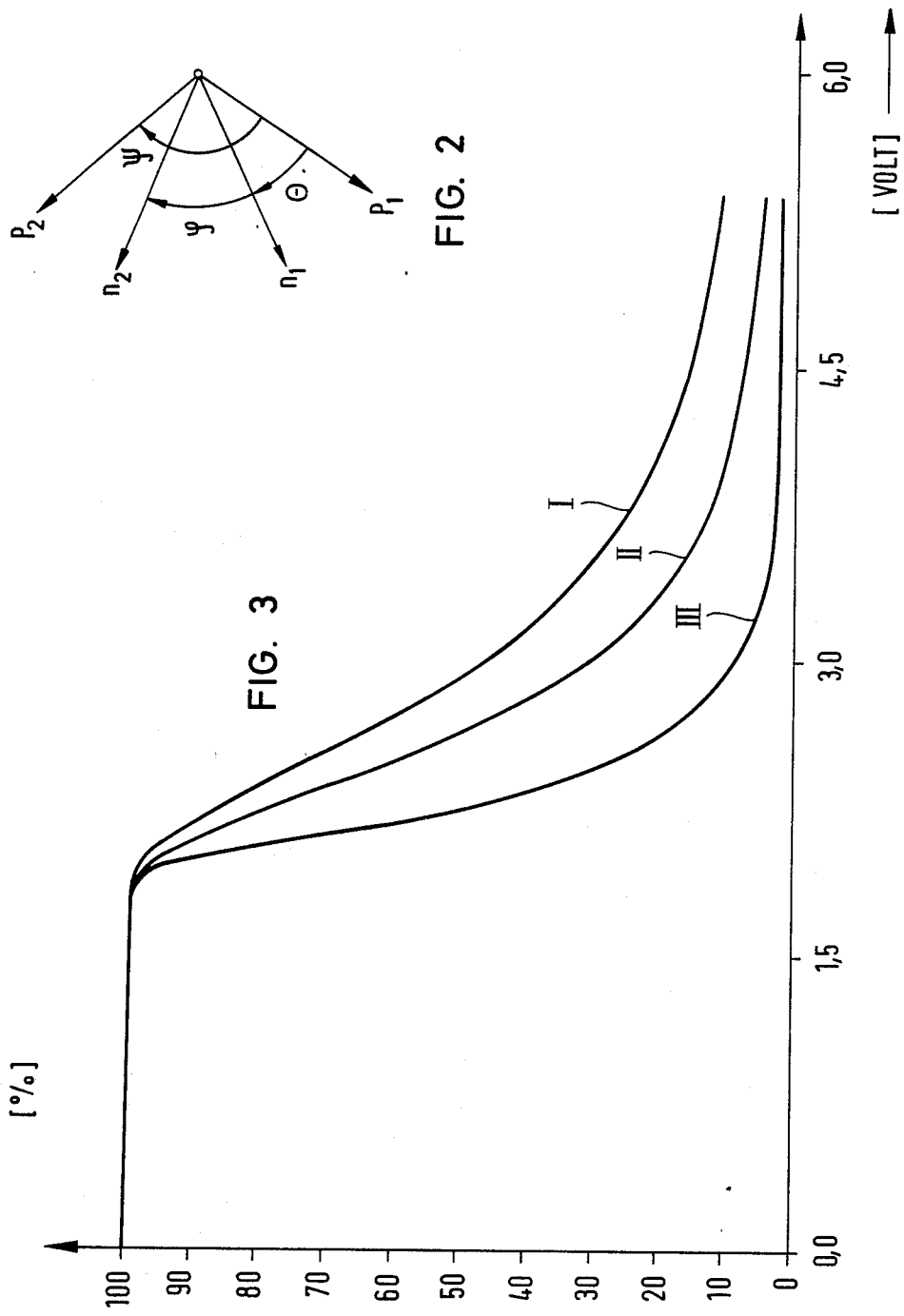
FIG. 3 illustrates a voltage-contrast curve of a preferred embodiment.

FIG. 3 shows the contrast curves characteristic of the electro-optical behaviour as compared with a conventional twisted nematic cell, the curves having been taken in white light at $\phi=30°$, $\theta=30°$ and $\psi=90°$ (curve 1) at $\phi=60°$, $\theta=15°$ and $\psi=90°$ (curve II) and at $\phi=90°$, $\theta=0°$ and $\psi=90°$ (conventional twisted nematic cell, curve III). As can be seen from FIG. 3, the curves become steeper as the angle of twist increases.

The cell hereinbefore described can be operated in transmission and in reflection.

I claim:

1. A liquid crystal display (LCD) cell, comprising a twisted nematic liquid crystal having a positive dielectric anisotropy, which is disposed between two plates having electrodes and surface orientations, and wherein the plates are disposed between two polarizers, and further including, in combination, a twist angle $\phi$ between the nematic directors of the liquid crystal at the respective plates of from about 10° to about 80°; an angle $\theta$ between the surface orientation direction and the polarization direction of the plate on the light incidence side of from about −30° to about 60°; an angle $\psi$ between the polarization directions of the two polarizers of from about 80° to about 110°; and an optical path difference Δn.d of from about 0.2 to about 0.7 μm.

2. The cell according to claim 1, wherein the optical path difference Δn.d is in a range from about 0.3 to about 0.5 μm.

3. The cell according to claim 1, wherein the twist angle $\phi$ is in a range from about 20° to about 60°.

4. The cell according to claim 1, wherein the twist angle $\phi$ is in a range from about 30° to about 50°.

5. The cell according to claim 1, wherein the angle $\theta$ is defined by the condition $\theta=(90°-\phi)/2$, the angle $\psi$ between the polarizers being 90°.

6. The cell according to claim 1, wherein the angle $\theta$ is in a range from about 0° to about 60°.

7. The cell according to claim 1, wherein the angle $\theta$ is in a range from about −30° to about 0°.

8. The cell according to claim 1, wherein the angle $\psi$ is about 90°.

9. A liquid crystal display (LCD) cell, comprising a twisted nematic liquid crystal having a positive dielectric anisotropy, which is disposed between two plates having electrodes and surface orientations, and wherein the plates are disposed between two polarizers, and further including, in combination, a twist angle $\phi$ between the nematic directors of the liquid crystal at the respective plates of from about 30° to about 50°; an angle $\theta$ between the surface orientation direction and the polarization direction of the plate on the light incidence side of from about −30° to about 60°; an angle $\psi$ between the polarization directions of the two polarizers of from about 80° to about 110°; and an optical path difference Δn.d of from about 0.2 to about 0.7 μm.

* * * * *